United States Patent

[11] 3,622,493

| [72] | Inventor | Francois A. Crusco<br>9, Sente des Ruelles, 78 Villiers-Saint-Frederic, France |
|---|---|---|
| [21] | Appl. No. | 787,770 |
| [22] | Filed | Dec. 30, 1968 |
| [45] | Patented | Nov. 23, 1971 |
| [32] | Priorities | Jan. 8, 1968 |
| [33] | | France |
| [31] | | 135,164;<br>Dec. 13, 1968, France, No. 178,161 |

[54] USE OF PLASMA TORCH TO PROMOTE CHEMICAL REACTIONS
5 Claims, 4 Drawing Figs.

[52] U.S. Cl.......................................... 204/323, 204/328
[51] Int. Cl.......................................... C22d 7/08
[50] Field of Search.................................. 204/170, 171, 323–328

[56] References Cited
UNITED STATES PATENTS

| 2,916,534 | 12/1959 | Schallus et al. | 204/171 X |
| 3,332,870 | 7/1967 | Orbach et al. | 204/171 X |
| 3,514,264 | 5/1970 | Sennewald et al. | 204/171 X |

Primary Examiner—John H. Mack
Assistant Examiner—Neil A. Kaplan
Attorney—Tourover and Browdy ABSTRACT: Chemical reactions, particularly the production of acetylene, are achieved by mixing a hydrocarbon material with a gas-carrying plasma torch issued from an electric arc, and allowing them to react in gaseous phase under a superatmospheric pressure under high turbulence. Preferably the gases thus formed are quenched and washed with liquid hydrocarbons in such a way that washing liquid refluxes into the zone in which the reaction takes place.

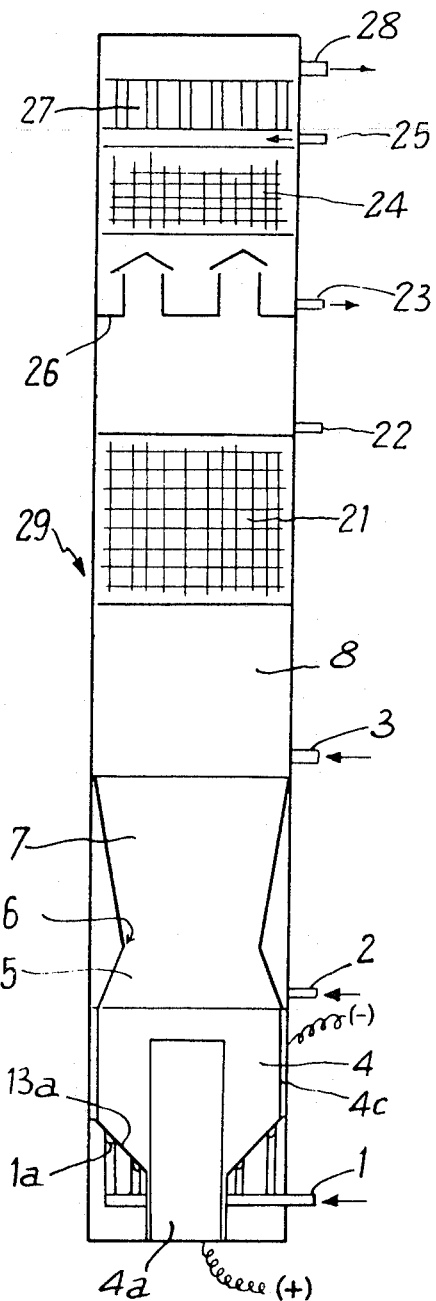

USE OF PLASMA TORCH TO PROMOTE CHEMICAL REACTIONS

This invention relates to the use of plasma torch to promote chemical reactions, it includes an improved process and apparatus for this kind of operations, to produce compounds such as acetylene, unsaturated hydrocarbons, cyanhydric acid and other nitrogenous compounds, and, more generally, all products that can be produced with a plasma torch.

The use of electric arcs to promote chemical reaction is well known; a variant to this conventional process consists in having the reaction performed within a gas, not in the arc itself, but at the outlet of the latter, where the reactants are mixed with the plasma issuing from the arc.

However, even with this configuration, the molar yields in desired products remain low, when operating at atmospheric pressure; to improve these yields, prior art recommends operating under reduced pressure in the reaction zone; but, then, it is necessary to compress the effluent up to a pressure at which the extraction of desired products becomes practical, and the costs of such a compression are quite high. Other difficulties, encountered during the compression, more particularly polymerization of unsaturated compounds, are increased by lowering operating pressure. Furthermore, the apparatus working under subatmospheric pressure are quite big, and exclude the possibility of very large unit capacities as required by nowadays industrial economics.

The present invention provides the advantage of obtaining a gas in which the partial pressure of the desired products is much higher than the one obtained in the known processes; it is then possible to extract these products, especially by absorption, directly, without any compression of the effluent from the reaction, or, eventually, with a slight compression, the cost of which is considerably lower than in the previous practice. Moreover the present invention provides an increased hourly unit capacity of the desired products, which considerably improves the economics of the process. On the other hand, the present process facilitates the cooling of the gases after the reaction; it is even possible to have the cooling done through a metallic wall, which was not possible in the previous practice. The present invention does not need, as in prior processes, the use of high current density electric arcs. Moreover, the present process and apparatus make it possible to obtain reacting mixtures quicker and more homogeneous.

The new process according to the present invention consists in mixing one or several compounds, either gaseous, vaporized, liquid or suspended solid in a gas carrier, which have to be reacted, with a gas carrying a plasma torch obtained from an electric arc, the mixture thus obtained being at a pressure higher than atmospheric.

Thus, and contrary to the subatmospheric pressure processes used until now for known reasons, the process according to the present invention uses higher pressures and provides, unexpectedly, the advantages hereabove described. Actually, the pressure applied can be higher than 100 atmospheres, it is however preferably in the range of 3 to 40 atmospheres, and, more particularly, from 5 to 20 atmospheres.

According to another very important feature of the present invention, a high turbulence is provided inside the reacting medium, immediately after the injection of the reactants into the plasma.

According to a preferred embodiment of the invention, the reacting medium which results from the mixing of the reactants with the plasma torch, remain in the reaction zone during a time sufficient to complete the desired reactions, after the turbulence is provided. This time is, of course, variable according to the nature of the reactants, and it is, for instance, one tenth of a second.

At the outlet of the reaction zone, the effluent is cooled down very abruptly. This quenching is obtained either directly with a cooling agent or indirectly. An indirect exchange can, actually, be obtained, without any danger of carbonaceous deposits on exchanger walls, if the proportion of hydrogen introduced in the reacting mixture, is high enough.

The present process is particularly useful for the cracking of hydrocarbons, to obtain unsaturated hydrocarbons, specially acetylene. Nitrogenous compounds, especially cyanhydric acid, can be obtained when the mixture contains nitrogen.

The carrier gas for the plasma torch, is advantageously a gas such as hydrogen, nitrogen, or a mixture obtained from hydrocarbons which have already been treated with a plasma or (eventually the same by recycling) and after the removal of the desired products, such as acetylene, cyanhydric acid, or other unsaturated hydrocarbons, as shown, for instance, on FIG. 3.

Such materials as methane, ethane, propane, butane, light gasoline, suspended carbonaceous tars or solids in hydrogen or nitrogen gas, etc. may be treated according to the invention.

If and when, for reason of economics, it is not desired to employ an excess of hydrogen carrier gas for the plasma torch, the accumulation of carbon in the apparatus can nevertheless be avoided by using a preferred form of the invention in which the scrubbing of the effluent stream resulting from the chemical reaction is effected with liquid hydrocarbons, in a countercurrent manner, in a washing zone constituting an immediate prolongation of the reaction zone, in such a way that the washing medium is refluxed to the reaction zone.

According to a preferred variant, the scrubbing of the effluent stream is effected in two immediately adjacent zones, the lower temperature boiling compounds being extracted between the first and second washing.

Another feature of the present invention consists in the injection of some of the plasma carrier gas in a region located at the back of the arc, tangentially to the wall of this back-zone, with a high linear velocity, in such a manner as to provide a vortex movement, which impedes the deposit of solid particles and moves the particles to and against the cathode wall.

Preferably some, for instance from 0 to 10 percent of the hydrocarbons stream to be reacted with the plasma torch, is directed to the wall of the cathode, so as to provide some cooling of this wall and, mainly, to provide on it, in a permanent manner, a protecting carbonaceous film.

In a special form of the present invention, the interior of the cathode, which is void, is cooled with bituminous hydrocarbons, eventually charged with graphite, some of which is continuously spread as a thin film on the cathode surface wall stricken by the electric arc.

The improved apparatus according to the present invention includes an electric arc in an enclosure which comprises means for introducing the gas to be passed through the electric arc and means for introducing reactants into a zone of the enclosure outside and downstream of the arc; the enclosure is adjacent to and communicates with a reaction chamber, while means for creating a high turbulence of the reaction mixture are located within the passage from said enclosure to said chamber.

As is the in known processes, cooling means are provided at the outlet of the reaction chamber.

In a preferred embodiment of the apparatus according to the invention the electrical arc, the reaction chamber where the hydrocarbons react with the plasma torch, the means for quenching and scrubbing the effluent stream with liquid hydrocarbons, follow sequentially each other, without any separation, inside one common vertical enclosure; in this arrangement, the electrical arc is in the bottom end of the apparatus and communicates, through the reaction chamber, with the quenching and scrubbing zones which are situated above the reaction chamber.

Preferably, one scrubbing zone comprises such contacting means as trickling means for washing gas with liquid hydrocarbons, and an empty space immediately below them and above the reaction chamber; withing the empty space droplets of liquid falling down meet the gas effluent stream issuing from the reaction chamber. The said contacting means are advantageously such as bars, grids, trays or similar known equipment. In a preferred form of the invention, the enclosure contains several scrubbing zones, located sequentially at the top of each other, while appropriate means for introducing or/and removing liquids between any two following zones are provided.

In a particular form of the invention, vapor condensers are also located inside the enclosure, at the top of the scrubbing zones.

The main advantage of this new configuration consists in the fact that undesired products, carbon particles, impurities and any compounds which have not reacted with the plasma torch run back form the more or less cold zones down to the hot zones where they are transformed by atomic hydrogen into light products, especially acetylene. Thus, the thermal and mass yields of the operation are greatly improved.

In a preferred form of the invention, the plasma zone is limited at the bottom, between the anode and cathode, by a conical wall, on the surface of which are uniformly located tangential openings, where part of the hydrogen is introduced. Thus, any solid particle present in this area is entrained upwards and against to the cathode.

In a particular form of the invention, the cathode, which is annular, is double-walled; the active wall of the electrode is provided with small bores, used to allow a little fraction of the cooling fluid, circulating between the two walls of the cathode, to pass inside the plasma chamber and spread on said active wall.

Nonlimitative examples of apparatuses objects of the invention are shown on the drawings.

FIG. 4 is a diagrammatic vertical axial section of an apparatus according to the preferred form of the invention.

Figure 1:
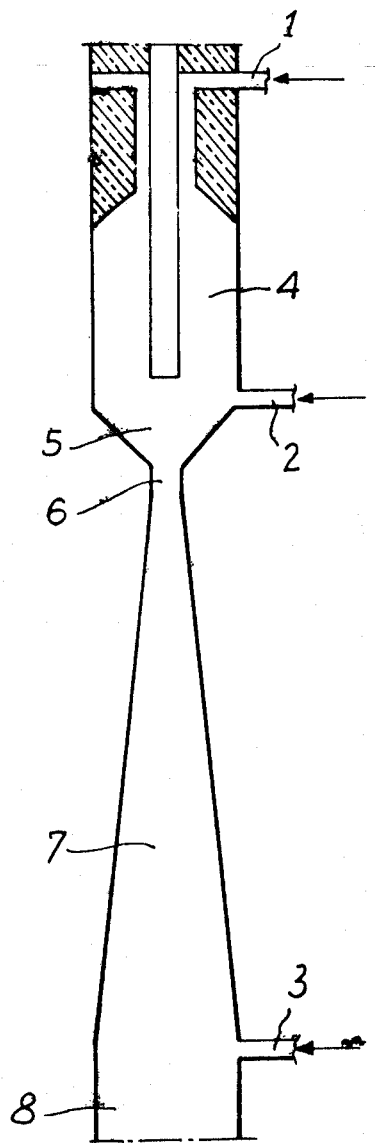
FIG. 1 is an axial diagrammatic section of the plasma and reaction zones.

Electrical arc is produced between the anode 4a and the cathode 4c, inside the intermediate space 4; the lateral wall of the enclosure of the electrical arc is provided by the cathode 4c itself. An extension of the enclosure forms a conical zone 5. The plasma carrier gas is introduced through the opening 1, whereas the reactants to be transformed are introduced through the opening 2. A reaction chamber 7 follows the enclosure 4–5. The means for producing a high turbulence within the gas mixture going to chamber 7, are located between the zone 5 and said chamber 7. Such means consist particularly of a fluted or grooved helical striction.

The chamber 7 is preferably divergent. Numerals 11 and 12 represent spaces for a cooling fluid inside the anode; 13 and 14 are special high-temperature insulating refractory blocks.

On FIG. 1, numeral 3 represents the injection of a quenching fluid, as that which is provided in a number similar known atmospheric or subatmospheric installations; however, in a particular form of the invention, the inlet 3 is provided for the introduction of a cooling fluid in an indirect exchanger located within the zone 8.

A very important feature of the invention is the existence, at 6, of appropriate means to provide a high turbulence in the gaseous reacting mixture. According to a nonlimitative form of the invention, shown on the drawing, these means consist in an appropriate striction, between the zone 5 where arrive the plasma from the electrical arc and the materials to be reacted, and the reaction chamber 7; more particularly, this striction is helically flute-grooved.

The operation of the apparatus is illustrated by the nonlimitative following example.

A gaseous stream of hydrogen, either pure or polluted with hydrocarbons, passes from 1 through and across the electrical arc flashing between 4a and 4c. Inside the arc, as maintained a stable average temperature, preferably in the range of 4,000° K. to 6,000° K., or eventually higher; this temperature may locally present wide variations. Thus, in the zone 4, one obtains essentially atomic hydrogen and/or preacetylenic free radicals, or atomic nitrogen, according to the composition of the plasma carrier gas. The plasma stream thus produced encounters, in zone 5, the hydrocarbons, for example methane, ethane or propane, injected in 2. This injection is actually done through one or more circumferencially distributed openings. The gaseous mixture goes then through the restriction 6 where it gets a very high turbulence. Inside the reaction chamber 7, the temperature stabilizes, itself very quickly near 2,000° K., due to the almost complete disappearing of atomic hydrogen and the concomitant production of acetylene with a maximum yield.

The residence time, between the introduction of methane in 2 and the introduction of the mixture into the reaction chamber 7, is in the order of milliseconds. After leaving the chamber 7, the gases are quenched quite quickly within zone 8. This cooling can be effected either with fresh methane, ethane, propane, etc., or with polluted hydrogen, obtained after quenching and removal of the desired products, acetylene for instance, or, in a preferred form of the invention, with very cold liquid hydrocarbons used to scrub the acetylene-rich gas.

Due to the pressure maintained in the zone 8 during the operation, preferably between 5 and 20 atmospheres, the quench in said zone 8 can be obtained in an indirect exchanger. This is due to the fact that under the operating conditions according to the invention, with a large enough quantity of hydrogen, there is no or only little carbon black, at the outlet of chamber 7.

Thus, the temperature is dropped, either by a direct quench or an indirect cooling, down to about 1,000° K. and the gases are then cooled down to ambient temperature or below, by such known means, preferably with the recovery of the available heat.

Figure 2:
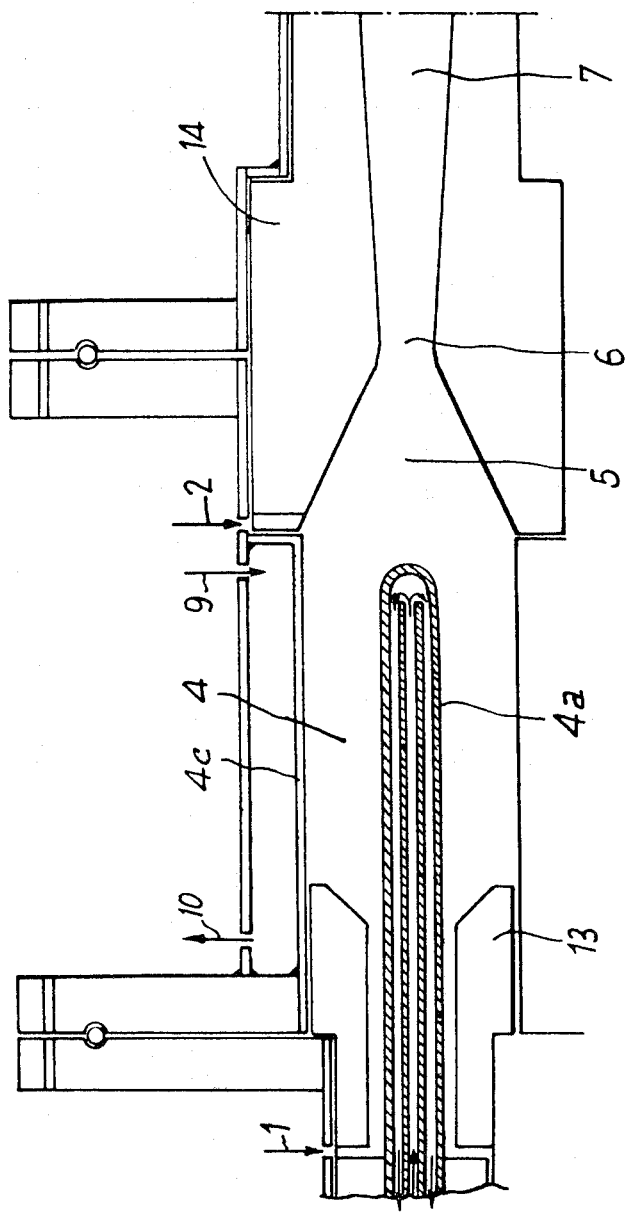
FIG. 2 is a more detailed axial diagrammatic section of the plasma and mixing zones.
Figure 3:
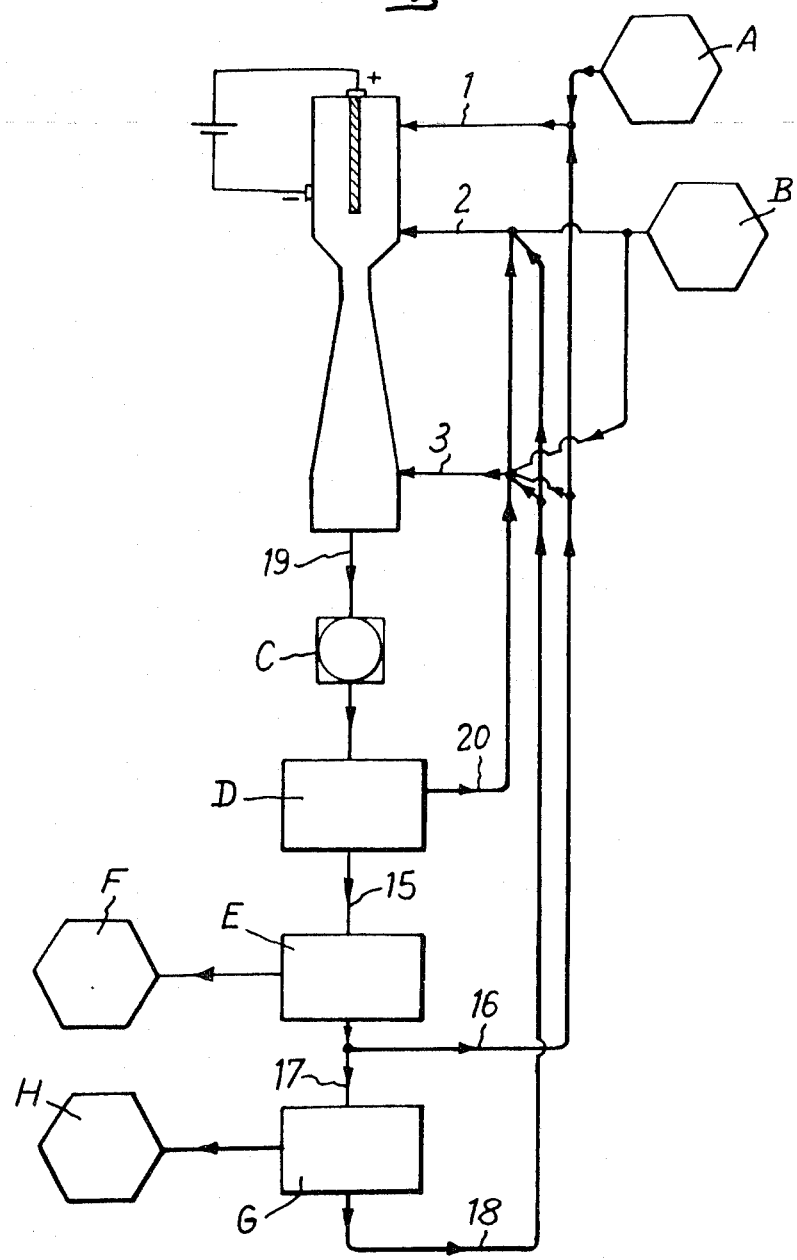
FIG. 3 shows a flowsheet of a particular embodiment of the invention.

On FIG. 3, the reactor detailed on FIGS. 1 and 2 is shown schematically with other parts of the installation, represented by the rectangles from A through H and the tielines 15 through 20. This scheme shows how, in a new manner, the recycling of byproducts of the reaction is effected, without the expensive purification of the whole effluent. The arrows show the manner in which the various materials circulate.

At A are means for the eventual introduction of fresh hydrogen makeup which might come from H. B provides the fresh hydrocarbon feedstock. Through 19, the products of the reaction pass into one or several heat exchangers C where the cooling is terminated.

In the particular case of acetylene production, the products pass first from C into an equipment D where heavy hydrocarbons, especially higher acetylenic compounds, are removed and sent back through 20 into 2 and/or 3. From D, through 15, the effluent stream goes into the acetylene absorbers E of a known type. The acetylene is released in F, whereas the remaining effluent hydrogen-rich stream goes partly, through 16, to the inlet 1 of the electric arc zone and/or, through 3, to the cooling zone, and partly into a purification installation G which releases pure hydrogen into H.

The residual products, obtained during the purification of some of the hydrogens are recycled back to the reactor, in 2 and/or 3, through 18.

Of course, the choice of the recycle points 1, 2, 3, and the proportions to be thus selected, depend on the particular conditions of the fabrication and the energy and mass balances of the different parts of the installation.

The form of the invention, shown on FIG. 3, has the important advantage of producing only acetylene and hydrogen, or acetylene, hydrogen and cyanhydric acid if the plasma carrier gas contains some nitrogen; all other intermediate products are recycled back to the appropriate zones of the reactor. Moreover, in this process, it is not necessary to purify the whole reactor effluent stream: after the rather easy absorption of acetylene, only the really produced hydrogen is purified.

On FIG. 4 which represents a preferred embodiment of the invention, numeral 29 designs an overall cylindrical enclosure containing various parts of the installation, shown separately on FIG. 3.

In the bottom of enclosure 29, one finds the electrical arc and the chamber 4, the electrodes 4a and 4c, the hydrogen and hydrocarbons inlets 1 and 2, the chambers 5 and 7, and the striction 6; anyone of these items is similar to the corresponding part of the FIGS. 1, 2 and 3. However, in this particular case, the bottom of the chamber 4 has a conical shape 13a; openings 1a, directed tangentially to the surface 13a, are provided for high velocity hydrogen jets; these openings 1a are either connected to the main inlets 1, distributed uniformly around the anode 4a, or are connected to a separate feed piping.

The hydrocarbons inlet 2 has a ring shape the outlet of which is directed to the axis of the apparatus; furthermore, some secondary openings are provided on the bottom side of the ring; thus, a small part of the injected hydrocarbons is thrown into the cathode 4c, thus providing some cooling of said cathode, and continuously producing on it a thin film of carbon, which protects the cathode from direct striking by the electric arc.

Cold hydrocarbons are injected into the apparatus at the inlet 3, to quench the effluent gas stream.

In 21, bars or grids are installed and wetted with liquid hydrocarbons, introduced through 22, to wash the gas coming from the zones 5–6–7–8; the liquid, well distributed by the bars or grids, contacts in an efficient manner the gas, removing last particles of tars and/or carbon black; the liquid then falls down into zone 8, in droplets which agglutinate the fine carbon black particle and then are dried in large particles which fall down to the hottest zones where they are attacked and destroyed by the atomic hydrogen, releasing some acetylene and preacetylenic free radicals.

A second scrubbing system 24 is provided above the first one and is constituted with trays, or filling material such as Raschig Rings, or any other known equipment. These washing means are wetted with liquid hydrocarbon coming either from 25 and/or from the upper condensing zone 27. In this zone 24, the washing takes place at a temperature lower than 0° C., preferably about −20° C. In the space between the zone 24 and the zone 21, a plain tray 26 provided with chimneys is installed to collect part or all of the light and cold hydrocarbons falling down from the zone 24. This liquid is extracted through the outlet 25, and is eventually recycled to 3.

In a particular form of the invention, the acetylene can be absorbed in the zone 24 and then desorbed in a separate equipment. The other hydrocarbons obtained in the desorber are recycled to 22 and 3.

The gases flow from 21 to 24 through the chimneys provided in the tray 26.

The overhead condenser 27 is used to liquefy the less volatile compounds from the gases which have been washed in the zones 21 and 24; the condensed compounds are used as a washing fluid in 24, alone or together with the hydrocarbons injected in 25. In a particular form of the invention, the condenser 27 is missing and it is replaced by the injection of light liquid hydrocarbons, for instance propane, previously cooled down to the appropriate temperatures. The washed, acetylene-rich gases, leave the apparatus through 28.

As a nonlimitative example, in the production of acetylene from propane, introduced through 2 in the apparatus shown on FIG. 4, the gases introduced in 1 and 1a are constituted with hydrogen containing up to 5 percent methane; the operating pressure is 15 atmospheres; the appropriate temperatures are then in the range of:

3,500° C. in the arc chamber 4;
1,700° C. in the reaction chamber 7;
300°–1,000° C. in the zone 8;
−20° C. for the liquid hydrocarbons injected in 3;
50°–300° C. in the scrubbing zone 21,
−20° C. for the liquid in the washing zone 24 and the condensing zone 27;
50°–20° C. for the gas in 24 and 27 respectively;
50° C. in the gas, at the inlet bottom of zone 24;
−20° C. in the gas, at the top outlet 28.

As seen, in this particular operation according to the invention, the gases pass through the three successive cooling zones; chamber 8, scrubbing system 21, washing-condensing system 24–27. Although this has been described as an improvement of the production of acetylene under pressure, it constitutes also a useful, novel and unexpected improvement of the atmospheric known processes and related apparatuses.

I claim:

1. Apparatus for the thermal cracking of substances, especially hydrocarbons, in the presence of a gas heated in an electric arc, comprising:

vertical enclosure means resistant to an internal gas pressure of 3–40 atmospheres;

an electric arc chamber disposed at the bottom of said enclosure having a centrally disposed anode and a cathode spaced axially from said anode, said electric arc chamber being provided with means for feeding hydrogen or nitrogen thereto;

a gas-mixing chamber disposed above and in communicating relationship with said electric arc chamber, and a reaction chamber immediately above and in direct communication with said gas-mixing chamber, means to feed a reactant gas, such as a hydrocarbon, to said mixing chamber, and a constricted passageway between said mixing chamber and said reaction chamber;

a free space extending above said reaction chamber and in direct communication therewith, and means for introducing a quenching fluid, such as cold hydrocarbon gas, into said free space at its lower part;

means to wash gas coming from said free space, said means being located immediately above said free space, said washing means comprising a gridlike structure located across the entire horizontal intersection of said enclosure above said free space, said gridlike structure being adapted to distribute in droplets a liquid poured onto said gridlike structure;

means for introducing a liquid into said enclosure at a level above said gridlike structure so that a liquid so introduced can wet said gridlike structure;

means for collecting a scrubbing liquid, said collecting means being located above said gridlike structure and above said liquid-introducing means for said gridlike structure, and means for removing said scrubbing liquid, said collecting means permitting gas to flow upwardly within said enclosure; and gas outlet means at the top of said enclosure.

2. Apparatus in accordance with claim 1, wherein a gas-liquid counterflow contacting means is provided across the entire horizontal intersection of said enclosure, above said scrubbing-liquid-collecting means, and further comprising a liquid inlet for said gas-liquid counterflow contact means located thereabove.

3. Apparatus in accordance with claim 2, wherein said scrubbing-liquid-contacting means comprises a tray provided with chimneys.

4. Apparatus in accordance with claim 2, further comprising cooling means located between said inlet for said gas liquid counterflow contacting means and said gas outlet at the top of said enclosure.

5. Apparatus in accordance with claim 1, wherein the bottom of said electric arc chamber is provided with a frustoconical configuration surrounding said central anode and sloping upwardly toward said cathode, and further comprising a plurality of gas inlets directed tangentially to said frustoconical surface and in direct communication with said hydrogen or nitrogen inlet.

* * * * *